US012798478B2

(12) United States Patent
Lin et al.

(10) Patent No.: US 12,798,478 B2
(45) Date of Patent: Nov. 17, 2026

(54) VEHICLE, VEHICLE WINDOW AND ATMOSPHERE LIGHT ASSEMBLY

(71) Applicant: FUYAO GLASS INDUSTRY GROUP CO., LTD., Fuqing (CN)

(72) Inventors: Zhirong Lin, Fuqing (CN); Zhixin Wang, Fuqing (CN); Yunxiang Ye, Fuqing (CN); Jiarong Ye, Fuqing (CN); Yiqi Wang, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 0 days.

(21) Appl. No.: 19/130,649

(22) PCT Filed: Nov. 16, 2023

(86) PCT No.: PCT/CN2023/131904
§ 371 (c)(1),
(2) Date: May 16, 2025

(87) PCT Pub. No.: WO2024/104408
PCT Pub. Date: May 23, 2024

(65) Prior Publication Data

US 2026/0192746 A1 Jul. 9, 2026

(30) Foreign Application Priority Data

Nov. 18, 2022 (CN) .......................... 202211451117.2

(51) Int. Cl.
*B60Q 3/51* (2017.01)
*B60Q 3/208* (2017.01)

(52) U.S. Cl.
CPC ............... *B60Q 3/51* (2017.02); *B60Q 3/208* (2017.02)

(58) Field of Classification Search
CPC .......... B60Q 1/268; B60Q 3/208; B60Q 3/51; B32B 17/10541; F21V 19/003; F21V 19/0035; F21V 19/004
See application file for complete search history.

(56) References Cited

U.S. PATENT DOCUMENTS 5,239,449 A 8/1993 Wnuk et al.
11,084,419 B1 * 8/2021 Chen ......................... F21V 9/32
(Continued)

FOREIGN PATENT DOCUMENTS

CN 208719940 U 4/2019
CN 214172039 U 9/2021
(Continued)

OTHER PUBLICATIONS

PCT International Search Report and Written Opinion (w/ English translation) for corresponding PCT Application No. PCT/CN2023/131904, mailed Feb. 28, 2024, 4 pages.
(Continued)

*Primary Examiner* — Erin Kryukova
(74) *Attorney, Agent, or Firm* — Dority & Manning, PA

(57) ABSTRACT

The present application relates to a vehicle, a vehicle window and an atmosphere light assembly. When a mounting member is mounted in a mounting cavity of a housing, a light-emitting element is arranged facing the outside of the mounting cavity, and a first limiting part abuts against the side of the mounting member facing away from the light-emitting element in a limiting manner. When the assembly of the housing and the mounting member is assembled on vehicle window glass, the light-emitting element faces a mounting hole. When the housing is fixedly connected to the vehicle window glass, by means of limiting cooperation
(Continued)

between the first limiting part and the mounting member, the light-emitting element is aligned with a circumferential side wall of the mounting hole.

14 Claims, 8 Drawing Sheets

(56) References Cited

U.S. PATENT DOCUMENTS

| | | | | |
|---|---|---|---|---|
| 2012/0320621 | A1 * | 12/2012 | Kleo | B32B 17/1066 362/558 |
| 2013/0033894 | A1 * | 2/2013 | Kleo | G02B 6/0095 362/602 |
| 2014/0204601 | A1 * | 7/2014 | Bauerle | B32B 17/10293 29/428 |
| 2014/0240998 | A1 * | 8/2014 | Richard | G02B 6/0095 362/510 |
| 2017/0217365 | A1 | 8/2017 | Janowiak et al. | |
| 2020/0122637 | A1 * | 4/2020 | Thannheimer | B60J 7/043 |
| 2021/0170724 | A1 * | 6/2021 | Hennion | B32B 17/10541 |
| 2024/0424983 | A1 * | 12/2024 | Rossmair | B60Q 3/208 |

FOREIGN PATENT DOCUMENTS

| | | | | | |
|---|---|---|---|---|---|
| CN | 114537268 | A | | 5/2022 | |
| CN | 216743994 | U | | 6/2022 | |
| CN | 217209053 | U | * | 8/2022 | |
| CN | 115742948 | A | | 3/2023 | |
| EP | 2737346 | B1 | | 5/2019 | |
| EP | 3695165 | B1 | | 12/2021 | |
| JP | 2001023431 | A | | 1/2001 | |
| JP | 2019016156 | A | | 1/2019 | |
| WO | WO-2013110885 | A1 | * | 8/2013 | G02B 6/0095 |

OTHER PUBLICATIONS

Chinese First Office Action (w/ English translation) for corresponding Application No. CN202211451117.2, issued Jul. 2, 2024, 15 pages.

Chinese Second Office Action (w/ English translation) for corresponding Application No. CN202211451117.2, issued Dec. 19, 2024, 14 pages.

Chinese Refusal Decision (w/ English translation) for corresponding Application No. CN202211451117.2, dated Apr. 18, 2025, 12 pages.

Extended European Search Report received in corresponding Application No. EP 23890839.6, dated Dec. 11, 2025, 13 pages.

* cited by examiner

VEHICLE, VEHICLE WINDOW AND ATMOSPHERE LIGHT ASSEMBLY

CROSS-REFERENCE TO RELATED APPLICATIONS

This application is a U.S. national phase application under 35 U.S.C. § 371 based upon international patent application No. PCT/CN2023/131904 filed on Nov. 16, 2023, which itself claims priority to Chinese patent application No. 202211451117.2, entitled "VEHICLE, VEHICLE WINDOW AND ATMOSPHERE LIGHT ASSEMBLY" filed with the China National Intellectual Property Administration on Nov. 18, 2022, the contents of which are hereby incorporated by reference in their entireties.

TECHNICAL FIELD

The present application relates to the technical field of vehicles, and particularly to a vehicle, a vehicle window, and an atmosphere light assembly.

BACKGROUND

In order to meet diversified use needs, atmosphere lights are usually integrated into vehicle windows such as skylight assemblies to create a varied in-vehicle environment. Meanwhile, atmosphere lights can also be used to display small patterns such as a logo. In this case, the light emitted by a light-emitting element is required to be incident into the glass from a side of the glass, so as to illuminate the small pattern on the glass to achieve the display effect. During the assembly process, the light-emitting element cannot be accurately aligned with the side of the glass, so that the light cannot be incident into the glass or only part of the light is incident into the glass, resulting in poor display effect.

SUMMARY

According to various embodiments of the present application, the present application provides a vehicle, a vehicle window, and an atmosphere light assembly.

The technical solutions are proposed as follows.

In an aspect, an atmosphere light assembly is provided, which is configured to be installed on a vehicle window glass, the vehicle window glass provided with a mounting hole. The atmosphere light assembly includes:

a housing provided with a mounting cavity and a first position-limiting part extending from a bottom wall of the mounting cavity toward an axial direction of the mounting cavity;

a mounting member disposed in the mounting cavity, one side of the mounting member fitted with the first position-limiting part in a position limiting manner; and a light-emitting element mounted on the mounting member and disposed away from the first position-limiting part, wherein the first position-limiting part is configured to enable the light-emitting element to be aligned with a circumferential side wall of the mounting hole through position-limiting fitting between the first position-limiting part and the mounting member when the housing is installed on the vehicle window glass.

The technical solutions are further described below.

In an embodiment, the mounting member is provided with a second position-limiting part, the second position-limiting part is disposed away from the first position-limiting part, and the second position-limiting part is configured to enable the light-emitting element to be aligned with the circumferential side wall of the mounting hole through position-limiting fitting between the second position-limiting part and the bottom wall of the mounting hole when the housing is installed on the vehicle window glass.

In an embodiment, the housing is further provided with a third position-limiting part, the third position-limiting part extends from the bottom wall of the mounting cavity toward the axial direction of the mounting cavity, and the third position-limiting part fits with a side of the mounting member away from the first position-limiting part in a position-limiting manner.

In an embodiment, the third position-limiting part comprises at least two limiting buckles spaced apart from each other and disposed circumferentially around the mounting member, and the at least two limiting buckles each extend to engage with a side of the mounting member away from the first position-limiting part.

In an embodiment, the housing is further provided with a horizontal limiting structure, the horizontal limiting structure is disposed circumferentially around the mounting cavity and protrudes from the mounting cavity, and the horizontal limiting structure extends along the axial direction of the mounting cavity to fit with the circumferential side wall of the mounting hole in a position limiting manner to limit horizontal displacement of the housing.

In an embodiment, the horizontal limiting structure comprises at least two limiting bosses spaced from each other, and the at least two limiting bosses each fit with the circumferential side wall of the mounting hole in a position limiting manner.

In an embodiment, one of the limiting bosses and one of the limiting buckles are integrally formed and cooperate to form a first assembly, another of the limiting bosses and another of the limiting buckles are adjacent and spaced apart and cooperate to form a second assembly, and the first assembly and the second assembly are respectively located on opposite sides of the mounting member.

In an embodiment, one of the limiting bosses is disposed opposite to another of the limiting bosses.

In an embodiment, one of the housing and the mounting member is provided with a positioning member extending along the axial direction of the mounting cavity, and another of the housing and the mounting member is provided with a positioning hole that is fitted with the positioning member in a plug-in manner.

In an embodiment, a lead wire notch is further provided on a side of the housing, and the lead wire notch is in communication with the mounting cavity.

In an embodiment, the atmosphere light assembly is further provided with a light blocking member, the light blocking member is disposed outside the mounting cavity and disposed circumferentially around the mounting cavity, the light blocking member abuts against and fits with the vehicle window glass, and the light blocking member is provided with a clearance notch in communication with the lead wire notch.

In an embodiment, an outer side wall of the housing is provided with a mounting flange, the atmosphere light assembly is provided with an adhesive layer, and the adhesive layer is bonded to the mounting flange and bonds to the vehicle window glass.

In another aspect, a vehicle window is provided, which includes a vehicle window glass and the atmosphere light assembly described above, wherein the vehicle window glass is provided with a mounting hole, the housing is mounted on the vehicle window glass, and the light-emitting element is aligned with a circumferential side wall of the mounting hole through position-limiting fitting between the first position-limiting part and the mounting member.

In an embodiment, the vehicle window glass includes an inner glass layer and an outer glass layer which are attached to each other, the inner glass layer is provided with the mounting hole, and a display pattern is provided on a side of the vehicle window glass facing the light-emitting element.

In yet another aspect, a vehicle is provided, which includes a vehicle body and the vehicle window described above, wherein the vehicle window is mounted on the vehicle body.

The details of one or more embodiments of the present application are set forth in the following drawings and description. Other features, objectives, and advantages of the present application will become apparent from the description, drawings, and claims.

BRIEF DESCRIPTION OF THE DRAWINGS

Drawings constituting a part of the present application are provided to explain the present application. The illustrative embodiments of the present application and the descriptions thereof are used to explain the present application and do not constitute an improper limitation on the present application.

In order to illustrate the embodiments of the present application more clearly, the drawings used in the embodiments will be described briefly. Apparently, the following described drawings are merely for the embodiments of the present application, and other drawings can be derived by those of ordinary skill in the art without any creative effort.

REFERENCE SIGNS IN DRAWINGS

10. vehicle window; 100. atmosphere light assembly; 110. housing; 111. mounting cavity; 112. first position-limiting part; 113. lead wire notch; 114. mounting flange; 115. adhesive layer; 120. mounting member; 121. positioning hole; 130. light-emitting element; 140. second position-limiting part; 150. limiting buckle; 160. limiting boss; 171. first assembly; 172. second assembly; 180. positioning member; 190. light blocking member; 191. clearance notch; 200. vehicle window glass; 210. mounting hole; 211. circumferential side wall; 220. inner glass layer; 230. outer glass layer; 300. lead wire.

DETAILED DESCRIPTION

Specific embodiments of the present application will now be described in detail with reference to the accompanying in order to make the objectives, technical features, and advantages of the present application more clear. Many specific details are described in the following description to facilitate fully understanding the present application. However, the present application can be implemented in many other ways different from those described herein. Those skilled in the art can make similar improvements without departing from the connotation of the present application, and the present application is not limited by the specific embodiments disclosed below.

In an embodiment, a vehicle is provided, including a vehicle body and a vehicle window 10. The vehicle window 10 is mounted on the vehicle body through a snap-fit connection, a screw connection, etc.

The vehicle body can be any existing vehicle body structure that needs to be mounted with the vehicle window 10.

The vehicle window 10 can display small patterns such as a logo. The vehicle window 10 can be a skylight.

Figure 1:
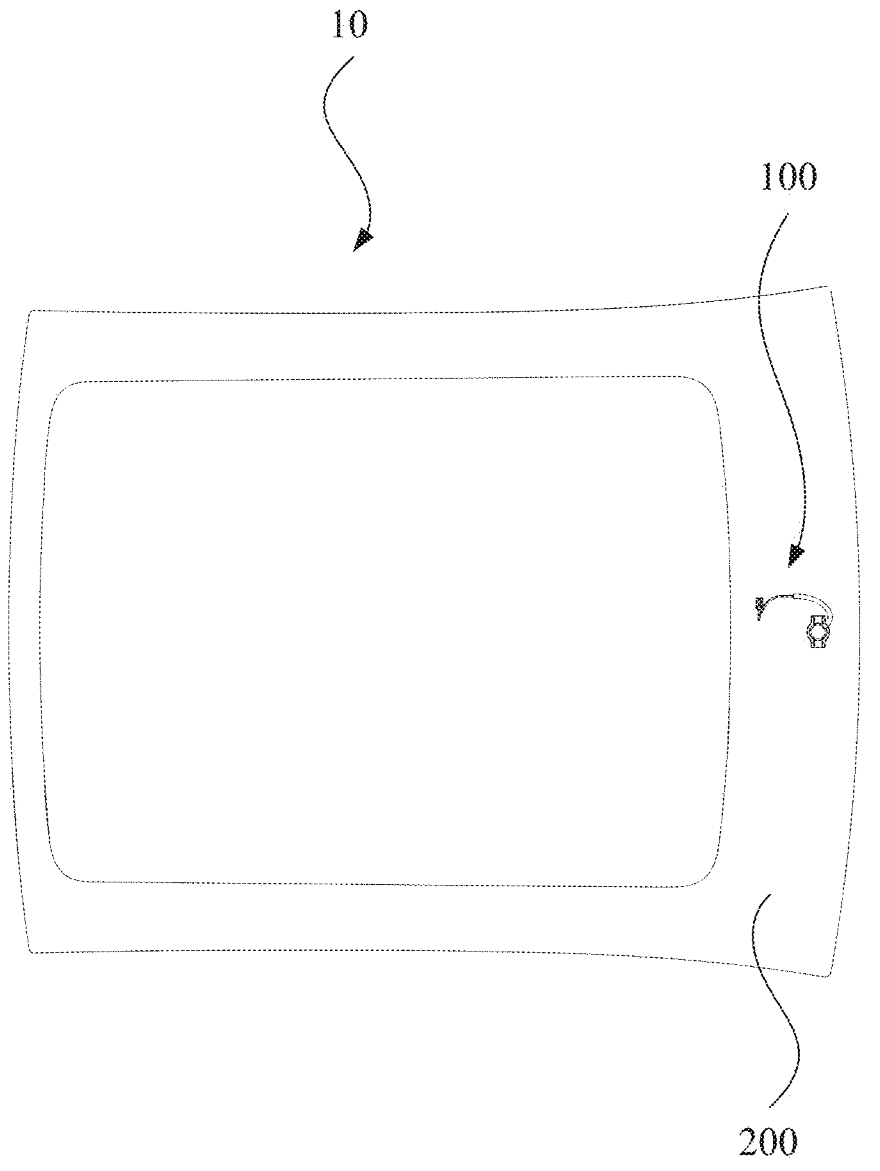
FIG. 1 is a schematic structural view of a vehicle window in an embodiment.
Figure 2:
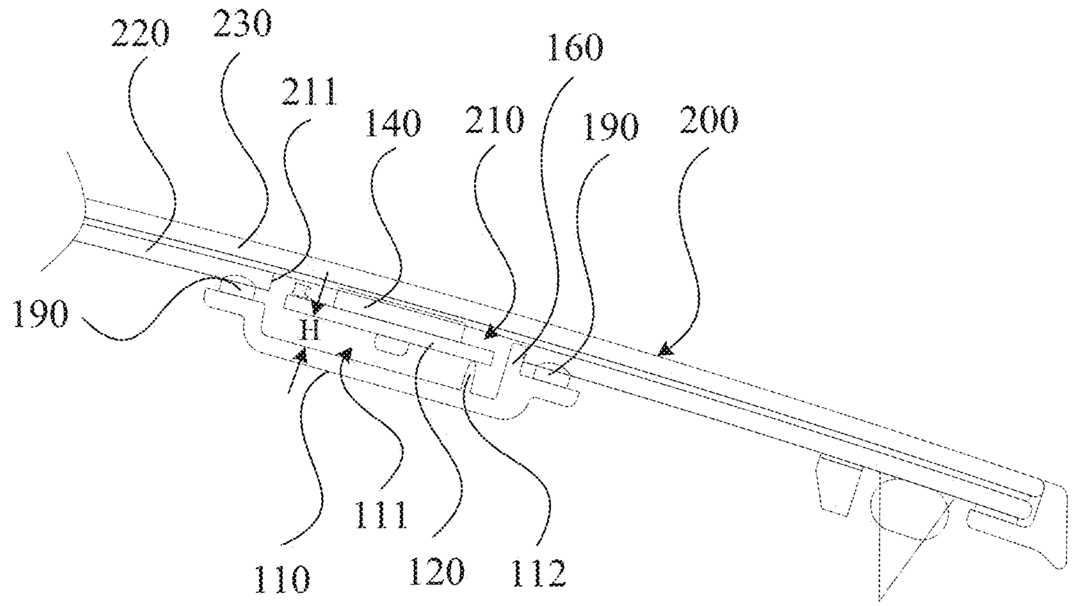
FIG. 2 is a cross-sectional view of the vehicle window of FIG. 1 viewed from one angle.
Figure 3:
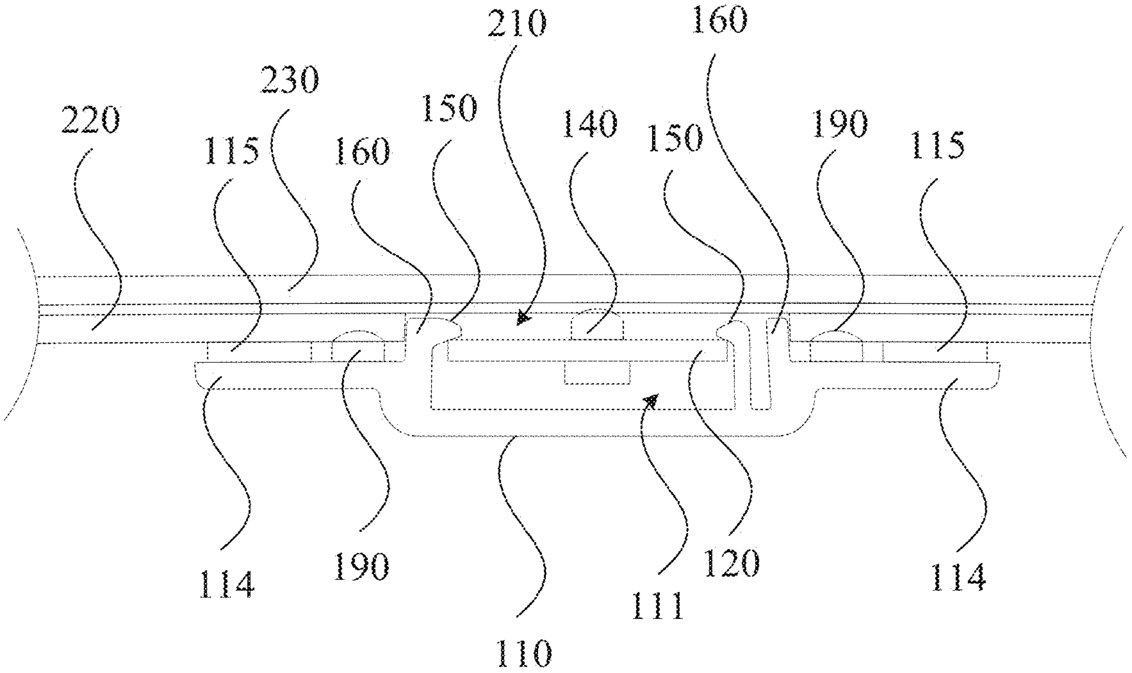
FIG. 3 is a cross-sectional view of the vehicle window of FIG. 1 viewed from another angle.

As shown in FIG. 1 to FIG. 3, optionally, the vehicle window 10 includes a vehicle window glass 200 and an atmosphere light assembly 100. The vehicle window glass 200 is provided with a mounting hole 210, which enables the atmosphere light assembly 100 to be assembled with and connected to the vehicle window glass 200, so that the light emitted by the atmosphere light assembly 100 can be totally incident into the vehicle window glass 200 from a circumferential side wall 211 of the mounting hole 210, so as to illuminate small patterns such as a logo, thereby achieving a good display effect.

Figure 4:
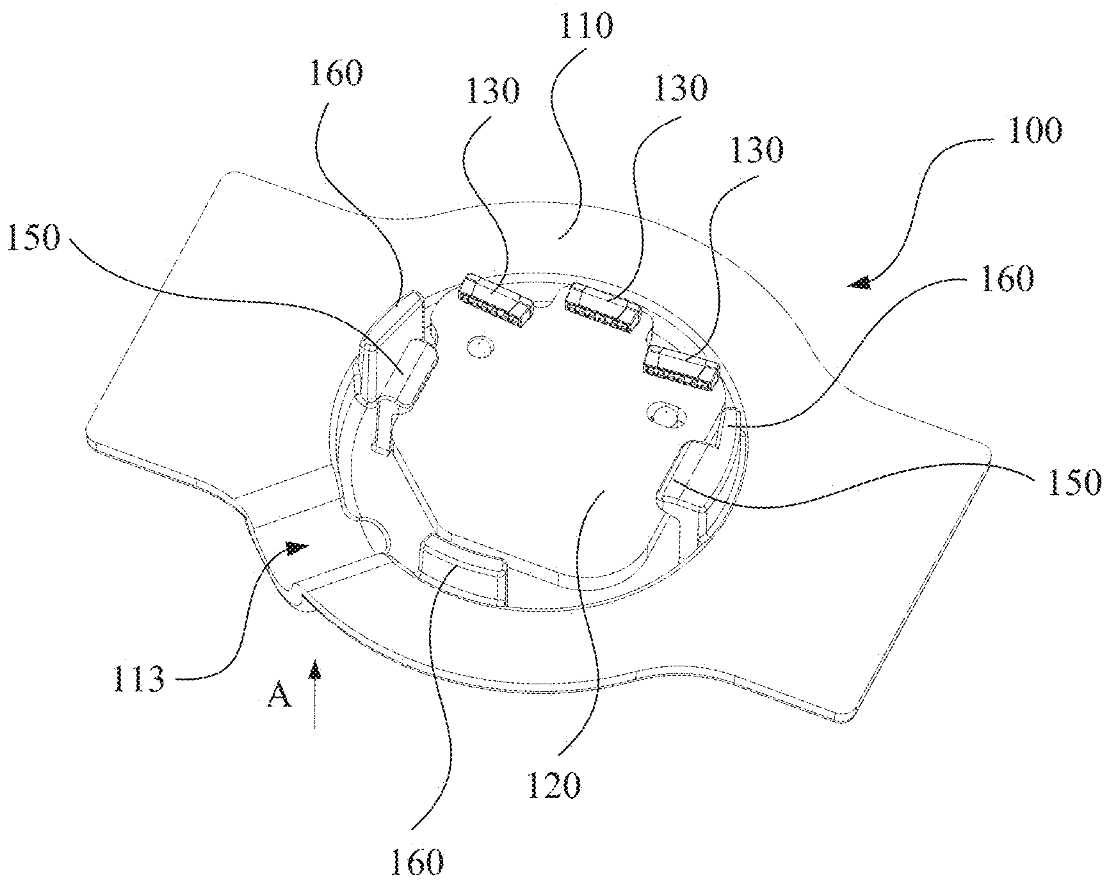
FIG. 4 is a schematic structural view of an atmosphere light assembly of the vehicle window of FIG. 1 viewed from one angle.
Figure 5:
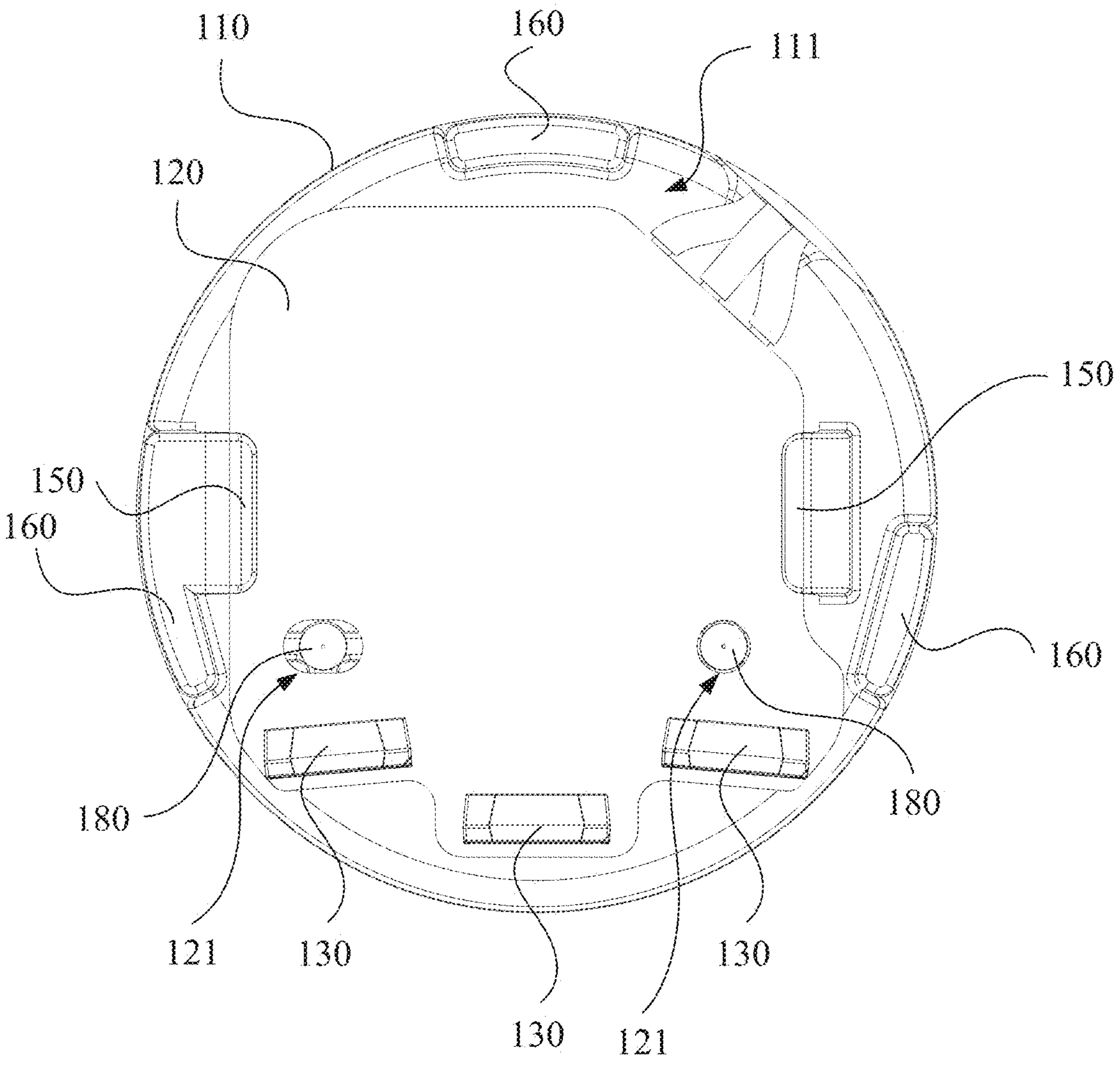
FIG. 5 is a schematic structural view of the atmosphere light assembly of the vehicle window of FIG. 1 viewed from another angle.

As shown in FIG. 4 and FIG. 5, in an embodiment, the atmosphere light assembly 100 includes a housing 110, a mounting member 120, and a light-emitting element 130.

Figure 6:
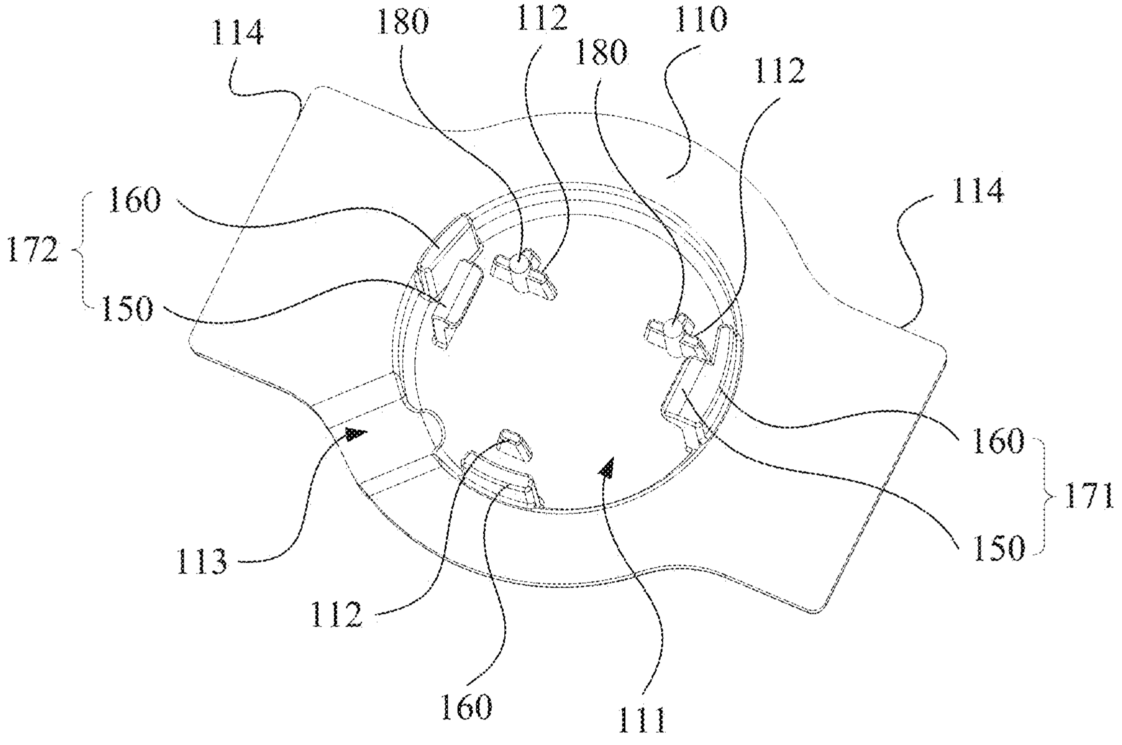
FIG. 6 is a schematic structural view of an embodiment of a housing of the atmosphere light assembly of the vehicle window of FIG. 1.

The housing 110 can be made by injection molding and is configured to provide necessary shielding or protection for the entire atmosphere light assembly 100. As shown in FIG. 6, the housing 110 is provided with a mounting cavity 111 and a first position-limiting part 112. The first position-limiting part 112 extends from a bottom wall of the mounting cavity 111 toward an axial direction of the mounting cavity 111, where the axial direction is as shown in the direction A of FIG. 4. That is, one end of the first position-limiting part 112 is connected to the bottom wall of the mounting cavity 111, and the other end of the first position-limiting part 112 extends toward the direction of the vehicle window glass 200.

The first position-limiting part 112 can be integrally formed with the entire housing 110. Alternatively, the first position-limiting part 112 and the housing 110 can be formed separately and then assembled and connected by screw connection or the like.

The mounting member 120 can be a plate-shaped structure such as a printed circuit board (PCB). The mounting member 120 is disposed in the mounting cavity 111, and one side of the mounting member 120 can be fit with the first position-limiting part 112 in a position limiting manner, so that the mounting member 120 is mounted at a suitable mounting height in the mounting cavity 1/1.

It is understandable that the mounting height of the mounting member 120 in the mounting cavity 111 can refer to a height of the mounting member 120 relative to the bottom wall of the mounting cavity 111, that is, a distance between the mounting member 120 and the bottom wall of the mounting cavity 111.

The position-limiting fitting between the first position-limiting part 112 and the mounting member 120 can be achieved by an abutting manner. For example, the first position-limiting part 112 can be in the form of a limiting boss 160, a limiting seat, or a limiting pin. When the mounting member 120 is disposed in the mounting cavity 111, the mounting member 120 abuts against the top of the first position-limiting part 112 to achieve the position-limiting fitting, so that the mounting member 120 is mounted at a suitable mounting height in the mounting cavity 111.

The light-emitting element 130 can be an element capable of emitting illumination light, such as a light-emitting diode (LED) lamp bead. The light-emitting element 130 is mounted on the mounting member 120 by bonding, clamping, or the like. The light-emitting element 130 is disposed away from the first position-limiting part 112. That is, the first position-limiting part 112 is located on one side of the mounting member 120, and the light-emitting element 130 is located on the opposite side of the mounting member 120.

Meanwhile, the first position-limiting part 112 is configured to enable the light-emitting element 130 to be aligned with the circumferential side wall 211 of the mounting hole 210 through position-limiting fitting between the first position-limiting part 112 and the mounting member 120 when the housing 110 is mounted on the vehicle window glass 200, that is, the projection of the light-emitting element 130 in the horizontal direction is located on the circumferential side wall 211 of the mounting hole 210, so that the light emitted by the light-emitting element 130 can be totally incident into the vehicle window glass 200, so as to illuminate small patterns such as a logo, thereby achieving a good display effect.

Specifically, when the mounting member 120 is mounted in the mounting cavity 111 of the housing 110, the light-emitting element 130 is disposed to face the outside of the mounting cavity 111, and the first position-limiting part 112 abuts against the side of the mounting member 120 away from the light-emitting element 130 in a position limiting manner, so that the mounting member 120 is mounted at a suitable mounting height in the mounting cavity 111. When the assembly of the housing 110 and the mounting member 120 is assembled on the vehicle window glass 200, the light-emitting element 130 faces the mounting hole 210. When the housing 110 is fixedly connected to the vehicle window glass 200, through position-limiting fitting between the first position-limiting part 112 and the mounting member 120, the light-emitting element 130 is aligned with the circumferential side wall 211 of the mounting hole 210, so that light emitted by the light-emitting element 130 can be totally incident into the vehicle window glass 200 from the circumferential side wall 211 of the mounting hole 210, so as to illuminate small patterns such as a logo on the vehicle window glass 200, thereby achieving a good display effect.

Optionally, the first position-limiting part 112 can be set as a retractable structure, which can be flexibly extended and retracted along the axial direction of the mounting cavity 111 according to actual installation needs, so that the mounting height of the mounting member 120 in the mounting cavity 111 can be flexibly adjusted according to actual installation needs, ensuring that the light-emitting element 130 is aligned with the circumferential side wall 211 of the mounting hole 210, which can adapt to different installation needs and has better versatility. Specifically, the first position-limiting part 112 can be in the form of a large tube and a small tube being mutually sleeved to achieve telescoping and locking. Alternatively, the first position-limiting part 112 can be in the form of two parts slidingly fitting with each other to achieve telescoping and locking.

Furthermore, the number of the first position-limiting part 112 can be flexibly adjusted or designed according to actual use requirements. For example, the first position-limiting part 112 can be one, two or more, which can provide good support and position limiting for the mounting member 120.

The housing 110 can be assembled onto the vehicle window glass 200 by screwing, bonding, plugging, etc.

Figure 7:
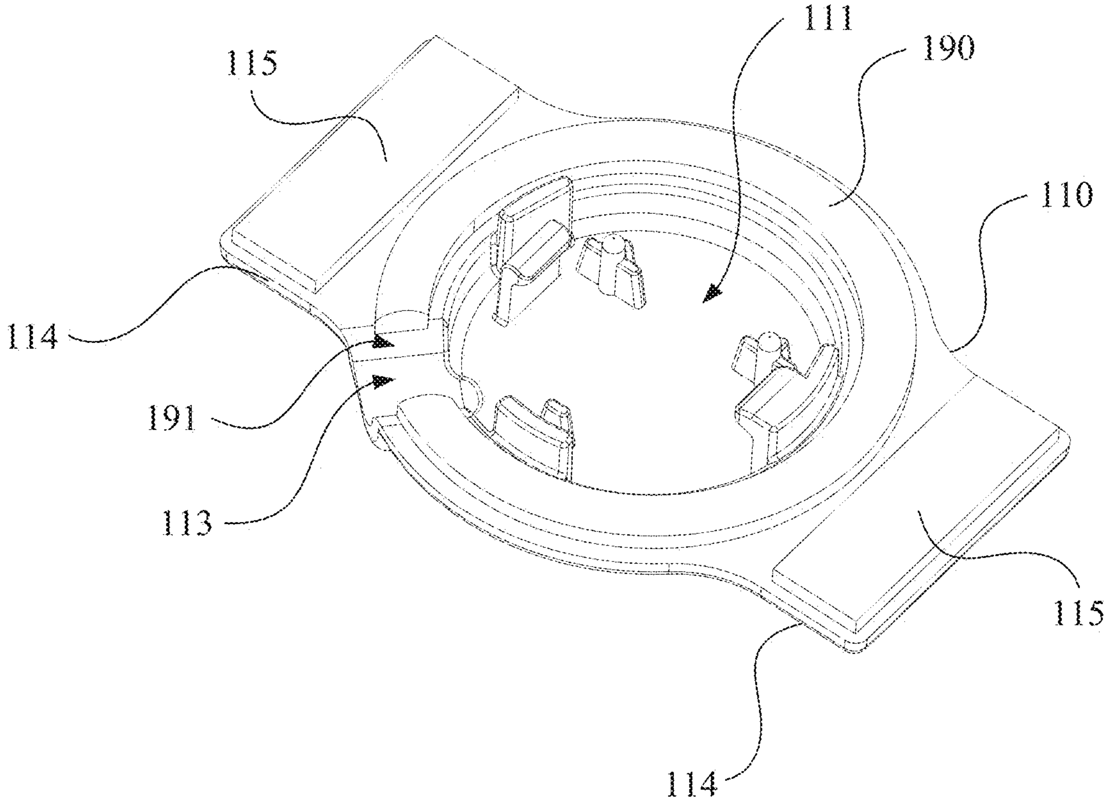
FIG. 7 is a schematic structural view of another embodiment of the housing of the atmosphere light assembly of the vehicle window of FIG. 1.

As shown in FIG. 3 and FIG. 7, in an embodiment, an outer side wall of the housing 110 is provided with a mounting flange 114, an adhesive layer 115 is provided on the atmosphere light assembly 100, and the adhesive layer 115 is bonded to the mounting flange 114. Thus, after the mounting member 120 and the light-emitting element 130 are mounted in the mounting cavity 111, by bonding the adhesive layer 115 on the mounting flange 114 to the vehicle window glass 200, the housing 110 is mounted on the vehicle window glass 200. Through position-limiting fitting between the first position-limiting part 112 and the mounting member 120, the light-emitting element 130 is aligned with the circumferential side wall 211 of the mounting hole 210. Moreover, connecting and fixing with the glass by bonding can also simplify the assembly process, improve assembly efficiency, and facilitate subsequent disassembly.

The adhesive layer 115 can be an adhesive component, such as a double-sided adhesive tape, a 3M tape, or the like.

As shown in FIG. 2 and FIG. 3, the vehicle window glass 200 includes an inner glass layer 220 and an outer glass layer 230 that are attached and connected to each other. Specifically, the inner glass layer 220 refers to the glass facing the inside of the vehicle, and the outer glass layer 230 refers to the glass facing the outside of the vehicle. The inner glass layer 220 is provided with the mounting hole 210. In addition, a display pattern is provided on the side of the vehicle window glass 200 facing the light-emitting element 130. As such, when the housing 110 is assembled on the inner glass layer 220, through position limiting fitting between the first position-limiting part 112 and the mounting member 120, the light-emitting element 130 can be aligned with the circumferential side wall 211 of the mounting hole 210 of the inner glass layer 220, so that the light emitted by the light-emitting element 130 can be totally incident into the inner glass layer 220, so as to illuminate the display pattern, thereby achieving a good display effect.

The inner glass layer 220 and the outer glass layer 230 can be connected by bonding or by pressing after resin filling. For example, a PVB film or an EVA film can be provided between the inner glass layer 220 and the outer glass layer 230.

The display pattern can be any graphic that needs to be displayed, such as a logo, etc. Moreover, the display pattern can be disposed on an inner surface of the inner glass layer 220 away from the outer glass layer 230, or disposed on an outer surface of the inner glass layer 220 facing the outer glass layer 230, or disposed between the inner surface and the outer surface of the inner glass layer 220, or disposed on a middle layer (such as a PVB film or an EVA film) between the inner glass layer 220 and the outer glass layer 230.

Figure 8:
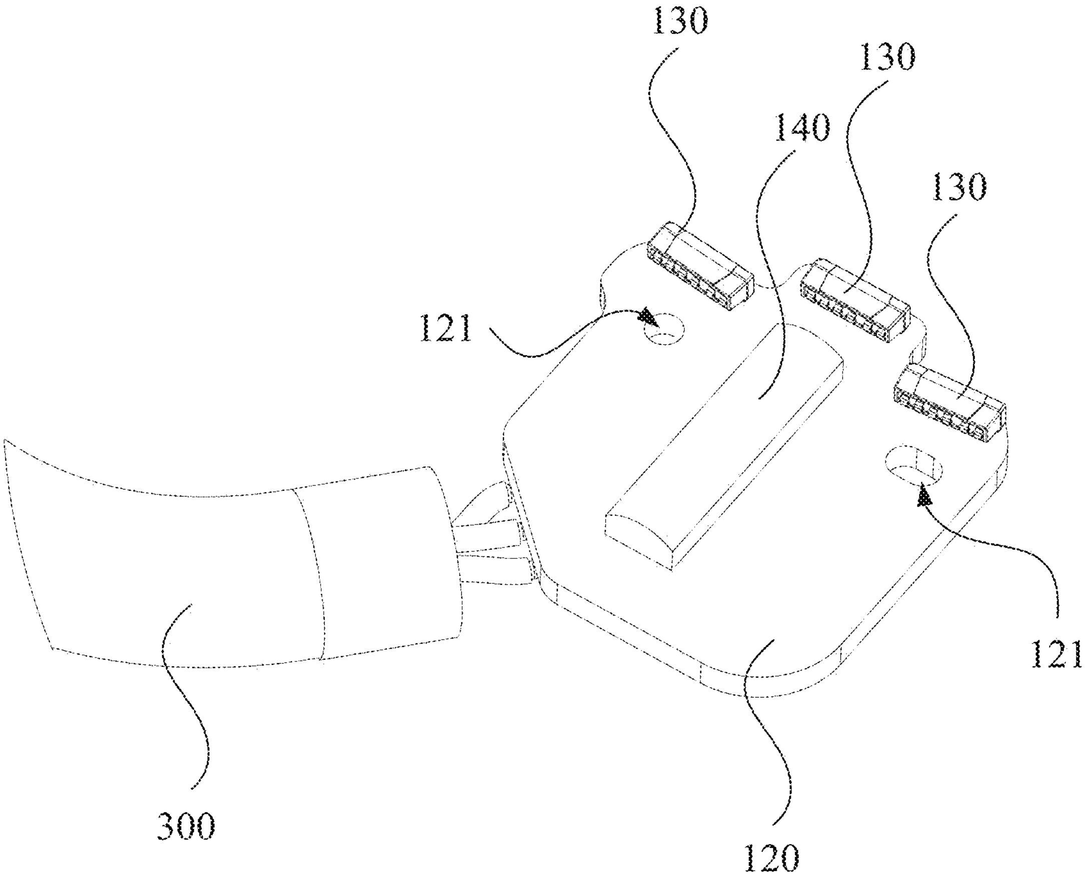
FIG. 8 is a schematic structural view of a mounting member and a light-emitting element of the atmosphere light assembly of the vehicle window of FIG. 1.
Figure 9:
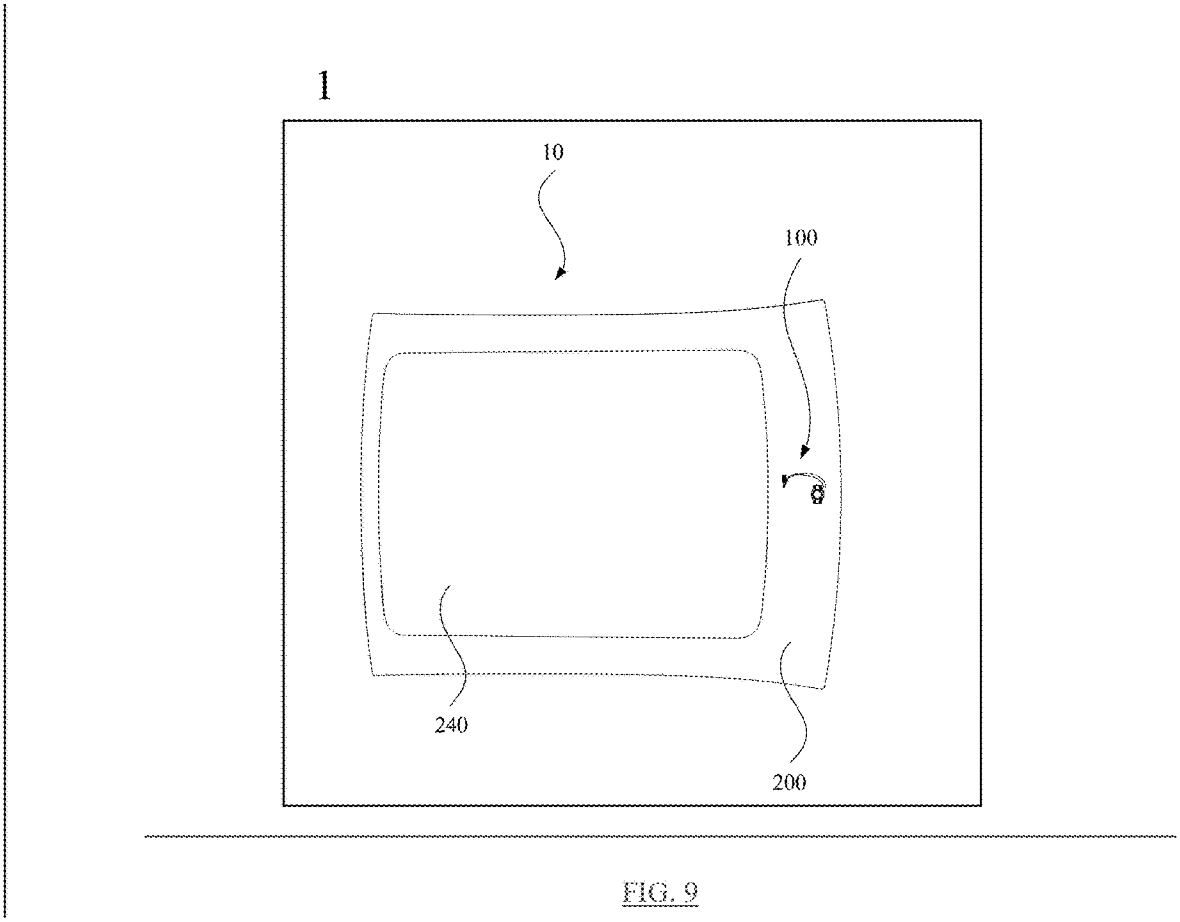
FIG. 9 is a schematic structural view of a vehicle in an embodiment, wherein 1 denotes the vehicle body, and 240 denotes the region where the display pattern is located.

As shown in FIG. 8, in addition, the atmosphere light assembly 100 further includes a lead wire 300 configured to supply power to the light-emitting element 130, and a chip configured to control the light-emitting element 130 to emit light, etc., which belong to existing technology and will not be described in detail here.

As shown in FIG. 6, meanwhile, a lead wire notch 113 is further provided on the side of the housing 11, and the lead wire notch 113 is in communication with the mounting cavity 111. As such, the lead wire 300 can extend from the lead wire notch 113 into the mounting cavity 111 and achieve electrical connection with the light-emitting element 130 to avoid interference or conflict.

The inner diameter of the lead wire notch 113 can match the outer diameter of the lead wire 300 to prevent the lead wire 300 from moving.

As shown in FIG. 3 and FIG. 7, the atmosphere light assembly 100 is further provided with a light blocking member 190. The light blocking member 190 is disposed outside the mounting cavity 111 and disposed circumferentially around the mounting cavity 111, so that the circumference of the mounting cavity III is enclosed by the light blocking member 190 to prevent leakage of light. Specifically, the light blocking member 190 is fixed on the side of the housing 110 facing the inner glass layer 220 by bonding or the like. Meanwhile, when the housing 110 and the inner glass layer 220 are assembled and connected, the light blocking member 190 abuts against the inner glass layer 220 of the vehicle window glass 200, which can effectively prevent light from leaking from the gap between the housing 110 and the inner glass layer 220. Moreover, the light blocking member 190 is provided with a clearance notch 191 connected to the lead wire notch 113. As such, interference of the lead wire 300 can be avoided, and the lead wire notch 113 and the clearance notch 191 can be blocked by the lead wire 300 to prevent light from leaking therefrom.

The light blocking member 190 can be in the form of a light blocking strip or a light blocking wall. The light blocking member 190 can be made of a flexible material, which can be in flexible contact with the inner glass layer 220 to avoid damage to the inner glass layer 220.

As shown in FIGS. 2, 3 and 8, in an embodiment, the mounting member 120 is further provided with a second position-limiting part 140. The second position-limiting part 140 is disposed away from the first position-limiting part 112. That is, the second position-limiting part 140 and the light-emitting element 130 are disposed on the same side of the mounting member 120. Furthermore, the second position-limiting part 140 is configured to enable the light-emitting element 130 to be aligned with the circumferential side wall 211 of the mounting hole 210 through position-limiting fitting between the second position-limiting part 140 and the bottom wall of the mounting hole 210 when the housing 110 is installed on the vehicle window glass 200. As such, when the housing 110 is fixedly connected to the vehicle window glass 200, the first position-limiting part 112 and the second position-limiting part 140 are respectively used to limit positions of the opposite sides of the mounting member 120, so that the light-emitting element 130 can be more accurately aligned with the circumferential side wall 211 of the mounting hole 210, and the light emitted by the light-emitting element 130 can be totally incident into the vehicle window glass 200 from the circumferential side wall 211 of the mounting hole 210, so as to illuminate the display pattern on the vehicle window glass 200, thereby achieving a good display effect.

Specifically, when the mounting member 120 is mounted in the mounting cavity 111 of the housing 110, the light-emitting element 130 is disposed toward the outside of the mounting cavity 111, and the first position-limiting part 112 abuts against the side of the mounting member 120 away from the light-emitting element 130 in a position-limiting manner, so that the mounting member 120 can be mounted at a suitable mounting height in the mounting cavity 111. When the housing 110 is fixed on the inner glass layer 220, the light-emitting element 130 faces the mounting hole 210. Through position-limiting fitting between the first position-limiting part 112 and a side of the mounting member 120, and position-limiting fitting between the second position-limiting part 140 and the bottom wall of the mounting hole 210, the position of the mounting member 120 is limited from the opposite sides in an abutting manner, the light-emitting element 130 is accurately aligned with the circumferential side wall 211 of the mounting hole 210, and the light emitted by the light-emitting element 130 can be totally incident into the vehicle window glass 200 from the circumferential side wall 211 of the mounting hole 210, so as to illuminate the display pattern on the vehicle window glass 200, thereby achieving a good display effect.

The second position-limiting part 140 can be in the form of a limiting convex strip, a limiting rib, or a limiting boss 160. Furthermore, the second position-limiting part 140 is arranged on the mounting member 120 in a manner such that it does not block or interfere with the light emitted by the light-emitting element 130, so that all the light emitted by the light-emitting element 130 can be totally incident into the inner glass layer 220 from the circumferential side wall 211 of the mounting hole 210. The second position-limiting part 140 can be integrally formed with the mounting member 120. Alternatively, the second position-limiting part 140 and the mounting member 120 can be formed separately and then assembled by bonding, clamping, etc.

In addition, in an embodiment, the housing 110 is further provided with a third position-limiting part (not labelled). The third position-limiting part extends from the bottom wall of the mounting cavity 111 toward the axial direction of the mounting cavity 111. That is, one end of the third position-limiting part is connected to the bottom wall of the mounting cavity 111, and the other end of the third position-limiting part extends toward the direction of the vehicle window glass 200. In addition, the third position-limiting part can fit with the side of the mounting member 120 away from the first position-limiting part 112 in a position-limiting manner. As such, by using the third position-limiting part, the assembly and connection between the mounting member 120 and the housing 110 can be realized, and the horizontal displacement of the mounting member 120 can be limited. Combined with the limitation of the vertical displacement of the mounting member 120 by the first position-limiting part 112 and the second position-limiting part 140, the mounting member 120 will not move relative to the housing 110, thereby ensuring the assembly accuracy of the mounting member 120, so that the light-emitting element 130 can be accurately aligned with the circumferential side wall 211 of the mounting hole 210.

The position-limiting fitting between the third position-limiting part and the mounting member 120 can be achieved by a snapping form or a plugging form, as long as the horizontal displacement of the mounting member 120 can be limited.

As shown in FIGS. 5 and 6, optionally, the third position-limiting part includes at least two limiting buckles 150 that are spaced apart from each other and disposed circumferentially around the mounting member 120, and the at least two limiting buckles 150 each extend to engage with the side of the mounting member 120 away from the first position-limiting part 112. As such, the limiting buckles 150 are clamped on the mounting member 120. Combined with position-limiting abutting between the first position-limiting part 112 and the mounting member 120, the mounting member 120 is stably and reliably mounted in the mounting cavity 111, and the assembly and connection between the housing 110 and the mounting member 120 is realized. Meanwhile, by using the limiting buckles 150 to abut against the circumference of the mounting member 120, the horizontal displacement of the mounting member 120 can be limited. Combined with the limitation of the vertical displacement of the mounting member 120 by the first position-limiting part 112 and the second position-limiting part 140, the mounting member 120 will not move relative to the housing 110, thereby ensuring the assembly accuracy of the mounting member 120, so that the light-emitting element 130 can be accurately aligned with the circumferential side wall 211 of the mounting hole 210.

Furthermore, the housing 110 is further provided with a horizontal limiting structure (not labelled). The horizontal limiting structure is disposed circumferentially around the mounting cavity 111 and protrudes from the mounting cavity 111, that is, the horizontal limiting structure extends out of the mounting cavity 111. In addition, the horizontal limiting structure extends along the axial direction of the mounting cavity 111 to fit with the circumferential side wall 211 of the mounting hole 210 in a position limiting manner, so as to limit the horizontal displacement of the housing 110, thereby avoiding the horizontal displacement of the housing 110 relative to the vehicle window glass 200, and ensuring that the housing 110 can be stably and reliably assembled and connected with the vehicle window glass 200. Meanwhile, the horizontal limiting structure in combination with the adhesive layer 115 can realize stable assembly and connection between the housing 110 and the inner glass layer 220 of the vehicle window glass 200, thereby improving the assembly strength.

The position-limiting fitting between the horizontal limiting structure and the circumferential side wall 211 of the mounting hole 210 can be achieved through an abutting manner or through a snap-fit connection, as long as the horizontal displacement of the housing 110 can be limited.

As shown in FIG. 5 and FIG. 6, optionally, the horizontal limiting structure includes at least two limiting bosses 160 spaced from each other. The at least two limiting bosses 160 are disposed circumferentially around the mounting cavity 111, and the at least two limiting bosses 160 each protrude from the mounting cavity 111 and extend to fit with the circumferential side wall 211 of the mounting hole 210 in a position limiting manner. As such, when the housing 110 is assembled and connected with the vehicle window glass 200, each of the limiting bosses 160 extends into the mounting hole 210 and abuts against the circumferential side wall 211 of the mounting hole 210 to achieve the position limiting fitting, thereby limiting the horizontal displacement of the housing 110 relative to the vehicle window glass 200, avoiding the horizontal displacement of the housing 110 relative to the vehicle window glass 200, and ensuring that the housing 110 can be stably and reliably assembled and connected with the vehicle window glass 200.

Preferably, the limiting bosses 160 are evenly disposed around the circumference of the mounting cavity 111, so that the housing 110 is evenly resisted in the horizontal direction and cannot be displaced relative to the window glass 200. For example, when there are three limiting bosses 160, the three limiting bosses 160 are evenly disposed at an included angle of 120° therebetween. When there are four limiting bosses 160, the four limiting bosses 160 are evenly disposed at an included angle of 90° therebetween.

As shown in FIG. 6, furthermore, one of the limiting bosses 160 and one of the limiting buckles 150 are integrally formed and cooperate to form a first assembly 171, so that the first assembly 171 has sufficient strength, which can not only improve the limiting strength and limiting accuracy of the limiting buckle 150 on the mounting member 120, but also improve the limiting strength and limiting accuracy of the limiting boss 160 on the housing 110. Another of the limiting bosses 160 and another of the limiting buckles 150 are adjacent and spaced apart and cooperate to form a second assembly 172, and the first assembly 171 and the second assembly 172 are respectively located on opposite sides of the mounting member 120. As such, when the mounting member is mounted in the mounting cavity 111, the limiting buckle 150 of the second assembly body 172 can be deformed in the direction away from the first assembly body 171, so as to facilitate placing the mounting member 120 between the first assembly body 171 and the second assembly body 172. After the mounting member 120 is fitted with the first position-limiting part 112 in a position limiting manner, the limiting buckle 150 of the second assembly body 172 is reset to snap-fit with the mounting member 120, thereby reducing the difficulty of assembly.

As shown in FIG. 6, furthermore, one of the limiting bosses 160 is disposed opposite to another of the limiting bosses 160. Specifically, the one of the limiting bosses 160 and the another of the limiting bosses 160 are respectively located at the opposite sides of the mounting member 120. For example, the two limiting bosses 160 can be respectively located at the left and right sides of the mounting member 120, so that the opposite sides of the mounting member 120 can be rigidly clamped and flexibly clamped respectively, which ensures the assembly strength and facilitates the assembly.

As shown in FIG. 5, optionally, one of the housing 110 and the mounting member 120 is provided with a positioning member 180 extending along the axial direction of the mounting cavity 111, and another of the housing 110 and the mounting member 120 is provided with a positioning hole 121 that is fitted with the positioning member 180 in a plug-in manner. As such, according to plug-in fitting between the positioning member 180 and the positioning hole 121, the installation of the mounting member 120 in the mounting cavity 111 is positioned, thereby improving the installation accuracy of the mounting member 120 in the mounting cavity 111. In addition, the plug-in fitting between the positioning member 180 and the positioning hole 121 can also ensure that the light-emitting element 130 can be accurately oriented to the required side, thereby playing a foolproof role.

Specifically, the bottom wall of the mounting cavity 111 is provided with the positioning member 180 extending along the axial direction of the mounting cavity 111, and the mounting member 120 is provided with the positioning hole 121. In addition, the number of positioning member 180 and the number of positioning hole 121 can be flexibly adjusted or designed, for example, two, three or more, as long as each positioning member 180 can be plugged into a corresponding positioning hole 121. In this case, the positioning member 180 can be integrally formed with the first position-limiting part 112 to improve the overall strength. Of course, the positioning member 180 can be spaced apart from the first position-limiting part 112.

The positioning member 180 can be in the form of a positioning pin, or a positioning column.

It should be noted that “a body” or “a part” can be a portion of a corresponding “component”, that is, the “body” or the “part” can be integrally formed with the “other parts of the component”. Alternatively, the “body” or the “part” can be an independent element that can be separated from the “other parts of the component”, that is, the “body” or the “part” can be manufactured independently and then assembled with the “other parts of the component” into a whole component. The expression of the “body” or the “part” described above in the present application illustrates only one embodiment for convenient reading, and does not limit the protection scope of the present application. Those containing the above-mentioned features and have the same function should be understood as equivalent technical solutions of the present application.

It should be noted that components included in “unit”, “assembly”, “mechanism”, or “device” of the present application can be flexibly combined, which can be modularly produced according to actual needs to facilitate modular assembly. The division of the above components in the present application illustrates only one embodiment for convenient reading, and does not limit the protection scope of the present application. Those containing the above-mentioned components and have the same function should be understood as equivalent technical solutions of the present application.

In the description of the present application, it should be understood that the terms “center”, “longitudinal”, “transverse”, “length”, “width”, “thickness”, “upper”, “lower”, “front”, “back”, “left”, “right”, “vertical”, “horizontal”, “top”, “bottom”, “inner”, “outer”, “clockwise”, “counterclockwise”, “axial”, “radial”, “circumferential” etc. indicate the orientations or positional relationships on the basis of the drawings. These terms are only for the convenience of describing the present application and simplifying the description, rather than indicating or implying that the related devices or element must have the specific orientations, or be constructed or operated in the specific orientations, and therefore cannot be understood as limitations of the present application. As used in the present application, the term “and/or” includes any or all combinations of one or more of the associated listed items.

In addition, the terms “first” and “second” are only used for descriptive purposes and cannot be understood as indicating or implying relative importance or implicitly indicating the quantity or order of the indicated technical features. Therefore, the features modified by “first” or “second” may explicitly or implicitly include at least one of the features. In the description of the present application, the “plurality” means at least two, such as two, three, etc., unless otherwise specifically defined.

In the present application, unless otherwise clearly specified and defined, the terms “installed”, “connected”, “coupled”, “fixed” and the like should be understood broadly. For example, an element, when being referred to as being “installed”, “connected”, “coupled”, or “fixed” to another element, unless otherwise specifically defined, may be fixedly connected, detachably connected, or integrated to the other element, may be mechanical connected or electrically connected to the other element, and may be directly connected to the other element or connected to the other element via an intermediate medium, or may be internal communication between two elements or interaction between two elements, unless otherwise explicitly defined. For those skilled in the art, the specific meanings of the above terms in the present application can be understood according to specific circumstances.

In the present application, unless otherwise specifically defined, a first feature, when being referred to as being located “on” or “under” a second feature, may be in direct contact with the second feature, or in indirect contact with the second feature via an intermediate medium. Moreover, a first feature, when being referred to as being located “on”, “above”. “over” a second feature, may be located right above or obliquely above the second feature, or merely located at a horizontal level higher than the second feature. A first feature, when being referred to as being located “under”, “below”, “beneath” a second feature, may be located right below or obliquely below the second feature, or merely located at a horizontal level lower than the second feature.

It should be noted that an element, when being referred to as being “fixed”, “disposed” or “mounted” to another element, may be directly fixed or mounted to the other element or via an intermediate element. An element, when being referred to as being “connected” to another element, may be directly connected to the other element or via an intermediate element. Furthermore, when one element is considered to be “fixedly connected to another element”, the two elements can be fixed in a detachable connection or in an undetachable connection, as long as power transmission can be achieved, such as through muff-coupling, snap connection, integral molding fixation, welding, etc., which can be achieved in the prior art and will not be repeated here. When an element is perpendicular or approximately perpendicular to another element, it means that the ideal state of the two elements is perpendicular, but due to the influence of manufacturing and assembly, there may be a certain vertical error. Terms “vertical”, “horizontal”, “up”, “down”, “left”, “right” and the like used herein are for illustrative purposes only and are not meant to be the only manes for implementing the present application. As used in the present application, the term “and/or” includes any or all combinations of one or more of the associated listed items.

It should also be understood that when explaining the connection relationship or positional relationship of elements, although not explicitly described, the connection relationship and positional relationship are interpreted as including an error range, which should be within the acceptable deviation range of a specific value determined by those skilled in the art. For example. “approximately”. “approximately” or “substantially” may mean within one or more standard deviations, which are not limited here.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present application.

The above-described embodiments are only several implementations of the present application, and the descriptions are relatively specific and detailed, but they should not be construed as limiting the scope of the present application. It should be understood by those of ordinary skill in the art that various modifications and improvements can be made without departing from the concept of the present application, and all fall within the protection scope of the present application. Therefore, the patent protection of the present application shall be defined by the appended claims.

What is claimed is:

1. An atmosphere light assembly, configured to be installed on a vehicle window glass, the vehicle window glass provided with a mounting hole, comprising:

a housing provided with a mounting cavity and a first position-limiting part extending from a bottom wall of the mounting cavity toward an axial direction of the mounting cavity;

a mounting member disposed in the mounting cavity, wherein the first position-limiting part abuts against one side of the mounting member in a position limiting manner; and a light-emitting element mounted on the mounting member and disposed away from the first position-limiting part, wherein the first position-limiting part is configured to enable the light-emitting element to be aligned with a circumferential side wall of the mounting hole through position-limiting fitting between the first position-limiting part and the mounting member when the housing is installed on the vehicle window glass;

wherein the housing is further provided with a third position-limiting part, the third position-limiting part extends from the bottom wall of the mounting cavity toward the axial direction of the mounting cavity, and the third position-limiting part fits with a side of the mounting member away from the first position-limiting part in a position-limiting manner.

2. The atmosphere light assembly according to claim 1, wherein the mounting member is provided with a second position-limiting part, the second position-limiting part is disposed away from the first position-limiting part, and the second position-limiting part is configured to enable the light-emitting element to be aligned with the circumferential side wall of the mounting hole through position-limiting fitting between the second position-limiting part and the bottom wall of the mounting hole when the housing is installed on the vehicle window glass.

3. The atmosphere light assembly according to claim 1, wherein the third position-limiting part comprises at least two limiting buckles spaced apart from each other and disposed circumferentially around the mounting member, and the at least two limiting buckles each extend to engage with a side of the mounting member away from the first position-limiting part.

4. The atmosphere light assembly according to claim 3, wherein the housing is further provided with a horizontal limiting structure, the horizontal limiting structure is disposed circumferentially around the mounting cavity and protrudes from the mounting cavity, and the horizontal limiting structure extends along the axial direction of the mounting cavity to fit with the circumferential side wall of the mounting hole in a position limiting manner to limit horizontal displacement of the housing.

5. The atmosphere light assembly according to claim 4, wherein the horizontal limiting structure comprises at least two limiting bosses spaced from each other, and the at least two limiting bosses each fit with the circumferential side wall of the mounting hole in a position limiting manner.

6. The atmosphere light assembly according to claim 5, wherein one of the limiting bosses and one of the limiting buckles are integrally formed and cooperate to form a first assembly, another of the limiting bosses and another of the limiting buckles are adjacent and spaced apart and cooperate to form a second assembly, and the first assembly and the second assembly are respectively located on opposite sides of the mounting member.

7. The atmosphere light assembly according to claim 6, wherein one of the limiting bosses is disposed opposite to another of the limiting bosses.

8. The atmosphere light assembly according to claim 1, wherein one of the housing and the mounting member is provided with a positioning member extending along the axial direction of the mounting cavity, and another of the housing and the mounting member is provided with a positioning hole that is fitted with the positioning member in a plug-in manner.

9. The atmosphere light assembly according to claim 1, wherein a lead wire notch is further provided on a side of the housing, and the lead wire notch is in communication with the mounting cavity.

10. The atmosphere light assembly according to claim 9, further provided with a light blocking member, wherein the light blocking member is disposed outside the mounting cavity and disposed circumferentially around the mounting cavity, the light blocking member abuts against and fits with the vehicle window glass, and the light blocking member is provided with a clearance notch in communication with the lead wire notch.

11. The atmosphere light assembly according to claim 1, wherein an outer side wall of the housing is provided with a mounting flange, the atmosphere light assembly is provided with an adhesive layer, and the adhesive layer is bonded to the mounting flange and bonds to the vehicle window glass.

12. A vehicle window, comprising a vehicle window glass and the atmosphere light assembly according to claim 1, wherein the vehicle window glass is provided with a mounting hole, the housing is mounted on the vehicle window glass, and the light-emitting element is aligned with a circumferential side wall of the mounting hole through position-limiting fitting between the first position-limiting part and the mounting member.

13. The vehicle window according to claim 12, wherein the vehicle window glass comprises an inner glass layer and an outer glass layer which are attached to each other, the inner glass layer is provided with the mounting hole, and a display pattern is provided on a side of the vehicle window glass facing the light-emitting element.

14. A vehicle, comprising a vehicle body and the vehicle window according to claim 12, wherein the vehicle window is mounted on the vehicle body.

* * * * *